(12) United States Patent
Mao et al.

(10) Patent No.: US 11,435,183 B2
(45) Date of Patent: Sep. 6, 2022

(54) MEASURING-ROBOT DEVICE FOR FULLY MECHANIZED COAL MINING FACE AND AUTOMATIC MEASURING SYSTEM

(71) Applicants: Beijing LongRuan Technologies Inc., Beijing (CN); Tianjin Navigation Instruments Research Institute, Tianjin (CN)

(72) Inventors: Shanjun Mao, Beijing (CN); Xinyuan Zhang, Tianjin (CN); Xinchao Li, Beijing (CN); Yang Tai, Tianjin (CN); Huazhou Chen, Beijing (CN); Jiazhuo Liu, Tianjin (CN)

(73) Assignees: BEIJING LONGRUAN TECHNOLOGIES INC., Beijing (CN); TIANJIN NAVIGATION INSTRUMENTS RESEARCH INSTITUTE, Tianjin (CN)

( * ) Notice: Subject to any disclaimer, the term of this patent is extended or adjusted under 35 U.S.C. 154(b) by 0 days.

(21) Appl. No.: 17/566,742

(22) Filed: Dec. 31, 2021

(65) Prior Publication Data
US 2022/0221276 A1    Jul. 14, 2022

(30) Foreign Application Priority Data

Jan. 12, 2021    (CN) .......................... 202110032953.6

(51) Int. Cl.
*G01C 15/00*    (2006.01)
*G01C 15/10*    (2006.01)
*G05D 1/02*    (2020.01)
*G01C 15/12*    (2006.01)

(52) U.S. Cl.
CPC ......... *G01C 15/006* (2013.01); *G01C 15/008* (2013.01); *G01C 15/105* (2013.01); *G01C 15/12* (2013.01); *G05D 1/0231* (2013.01); *G05D 1/0287* (2013.01); *G05D 2201/021* (2013.01)

(58) Field of Classification Search
CPC .................................................. G01C 15/006
See application file for complete search history.

(56) References Cited

FOREIGN PATENT DOCUMENTS

| CN | 110595448 | A |   | 12/2019 |              |
|----|-----------|---|---|---------|--------------|
| CN | 111854712 | A |   | 10/2020 |              |
| CN | 111927557 | A |   | 11/2020 |              |
| CN | 112378390 | A | * | 2/2021  | .... G01C 15/00 |
| CN | 112593989 | A | * | 4/2021  |              |
| JP |   3911167 | B2 |  | 5/2007  |              |

* cited by examiner

*Primary Examiner* — Michael A Berns
(74) *Attorney, Agent, or Firm* — Bayramoglu Law Offices LLC

(57) ABSTRACT

A measuring-robot device for fully mechanized coal mining faces and an automatic measuring system are provided. The measuring robot includes a suspension cage, a total station, a prism and an industrial computer. Firstly, the suspension cage with automatic leveling function is fixed on the top beam of a hydraulic support, then the total station and the industrial computer are fixed in the suspension cage, and finally the prism with a plug connector is installed under the base of the total station, forming a measuring-robot device. According to the fluctuations of the fully mechanized coal mining face, several measuring robots will be deployed along the fully mechanized coal mining face, and the adjacent measuring robots are line of sight to each other, forming the automatic measuring system covering the fully mechanized coal mining.

7 Claims, 3 Drawing Sheets

MEASURING-ROBOT DEVICE FOR FULLY MECHANIZED COAL MINING FACE AND AUTOMATIC MEASURING SYSTEM

CROSS REFERENCE TO THE RELATED APPLICATIONS

This application is based upon and claims priority to Chinese Patent Application No. 202110032953.6, filed on Jan. 12, 2.021, the entire contents of which are incorporated herein by reference.

TECHNICAL FIELD

This present disclosure relates to the field of intelligent coal mining, and particularly relates to a measuring-robot device for a fully mechanized coal mining face and an automatic measuring system.

BACKGROUND

With the development of intelligent mines, the government encourages people-less operation or unattended operation in the hazardous working area of a fully mechanized coal mining face. It is important to realize the transparency of geological resources of a fully mechanized coal mining face for the safety by people-less and unattended operation there. The transparency of the fully mechanized coal mining face is based on a unified 3D coordinate system of the fully mechanized coal mining face.

The excavation in the fully mechanized coal mining face is a dynamic process. Therefore, it has to be carefully considered that how to deploy the control network on the fully mechanized coal mining face and how to establish the highly precise spatial relationship in a unified coordinate system quickly and automatically in the fully mechanized coal mining face. Until now, no universal solution has been proposed due to the harsh environmental conditions of underground coal mine and problems such the restricted space and the strong magnetic field. the GPS and the Beidou Positioning System has no effect even they work well on the ground. The current measuring methods for the fully mechanized coal mining face and the main problems are as follows:

(1) The measurement of target points is performed periodically by traverse surveying (for example, surveying during the maintenance for every other week or half a month). After the fully mechanized coal mining face is moving forward, the entire spatial relationship has been broken, which cannot meet the demand of real-time positioning of the intelligent fully mechanized coal mining face.

(2) The measurement of target points in the fully mechanized coal mining face based on total stations with gyroscope can dynamically establish the spatial relation in a unified coordinate system. The gyroscope is used for measuring north. However, in this case, the dominant measuring robot and the ordinary measuring robots are all equipped by total stations with gyroscope. In the present disclosure, if there is one visible control point in the laneway, the dominant measuring robot use a total station with gyroscope, while the ordinary measuring robots use a total station without a gyroscope automatically. After the fully mechanized coal mining face is moving forward, the north seeking of the gyroscope total station is time-consuming (the higher precision of the north angel the gyroscope measure, the more time it uses). Moreover, the gyroscope total station is extremely expensive and can hardly work well in severe conditions (e.g. high temperature, high humidity and vibration).

(3) The measurement of target points in the fully mechanized coal mining face based on distance intersection can dynamically establish a spatial relation in a unified coordinate system. However, except that the dominant total station at head or tail of the mine-used scraper conveyor, the total stations in the middle can't use the distance intersection method because three points (i.e., the station point and the two control points used in the distance resection) approximately lay on the same one straight line, and the angle with the station point as vertex is approximately zero degree, which can bring a large error to the coordinates and even fail to calculate.

SUMMARY

In view of the above problems, it is proposed that a measuring-robot device for a fully mechanized coal mining face and an automatic measuring system, which employs measuring robots formed by a suspension cage, a total station, a prism and an industrial computer. Replacing gyroscope total stations by the measuring robots, the problems of using gyroscope total stations can be solved, such as time-consuming north seeking, high cost and inapplicability in severe environments.

According to an aspect of the present disclosure, a measuring-robot device for a fully mechanized coal mining face, wherein each of measuring robots is formed by a suspension cage, a total station, a prism and an industrial computer, wherein:

The suspension cage is installed on the top beam of a hydraulic support in the fully mechanized coal mining face, and is for loading the total station, the industrial computer and the prism;

The suspension cage can automatically level, ensuring that the total station inside it maintains horizontal;

The suspension cage is an enclosed space that is waterproof, dust-proof and shock-proof. Because the points are approximately lay on the same line, transparent windows are set at the front and back of the suspension cage for the operation of the total station;

The total station is a measurement platform that integrates automatic target recognition, automatic collimation, automatic angle measurement and distance measurement, automatic target tracking, automatic calculation and automatic storage. The total station is fixed in the center of the cage cavity;

The prism is an optical target device measured by the total station. It can be classified into ordinary type and 360-degree type. The prism is installed at the bottom of the suspension cage, whose position is aligned with the total station in the same plumb line. This setting ensures that the horizontal geodetic coordinates of the prism is the same as that of the station point;

The industrial computer is carried inside the suspension cage, installed with a built-in automatic control program of the measuring-robot device. The program controls the measuring-robot device where the industrial computer is located and commands other measuring robots to operate cooperatively;

According to different installation sites and usages, the measuring robots are classified into dominant measuring robot and ordinary measuring robots. The total station of the dominant measuring robot is ordinary or with a gyroscope north seeker, while the total station of the ordinary measuring robots is just ordinary without a gyroscope north seeker;

The ordinary measuring robots using the ordinary total station orients itself by the backsight of the prism under a measuring robot at coordinates-known point. It then looks forward for a prism under a measuring robot at coordinates-unknown point and measures the angles (i.e. horizontal and vertical) and the slope distance to the prism to obtain the coordinate of the relevant measuring robot.

Optionally, the dominant measuring robot refers to the one that is fixed on the top beam of a hydraulic support at head or tail of a conveyor in the fully mechanized coal mining face;

And the ordinary measuring robots refer to those are fixed on the top beam of a hydraulic support at a middle position of the fully mechanized coal mining face.

Optionally, methods of determining the coordinate of the station point of the dominant measuring robot includes:

(1) The dominant measuring robot finds two prisms on control points of the coal wall, and then measures slope distances and angles between the station point of the dominant measuring robot to the two prisms. Finally, calculates the coordinate of the station point of the dominant measuring robot by using the distance resection method;

(2) The total station in the dominant measuring robot is a gyroscope total station with north seeking function. The gyroscope total station performs automatic north seeking to determine the orientation from the station point of the dominant measuring robot to a prism on a control point of the coal wall. Then, by measuring the slope distance of angles from the total station to the control point, the coordinate of the station point of the dominant measuring robot can be calculated.

Optionally, the coordinates of the station point of ordinary measuring robots are calculated by the open traverse surveying method.

The second aspect of the present disclosure provides an automatic measuring system. The system comprises the measuring-robot devices for a fully mechanized coal mining face according to the first aspect of the present disclosure, which include a dominant measuring robot. The arrangement of the automatic measuring system comprises:

Prisms are set on control points those are on coal walls near the head or tail of the conveyor in a fully mechanized coal mining face. The geodetic coordinates of control points of coal walls are measured previously, and these control points serve as basis points for the dominant measuring robot;

The dominant measuring robot is fixed on the top beam of a hydraulic support at head or tail of the conveyor in the fully mechanized coal mining face;

According to the fluctuations of the fully mechanized coal mining face, the ordinary measuring robots are fixed on the top beam of the hydraulic supports in the fully mechanized coal mining face, ensuring that the adjacent measuring robots including the dominant measuring robot are visible to each other. Then the measuring and controlling network can cover the entire coal-mining-face.

Optionally, the working process of the automatic measuring system comprises following steps:

(1) The automatic measuring system starts operating;

(2) It obtains the coordinates of the station point of the dominant measuring robot by using the control points of the coal wall. Then the dominant measuring robot looks for the prism under an adjacent measuring robot to obtain the coordinate of its station point. At the same time, the dominant measuring robot can measure geodetic coordinates of fixed targets and moved targets;

(3) Each of the ordinary measuring robots orients itself by looking for the prism under a measuring robot with known station point. Then it obtains the coordinates of the station point of other measuring robots by looking for the prism under the other measuring robot with an unknown station point, measuring the slope distance and angles. At the same time, the ordinary measuring robot can measure geodetic coordinates of fixed targets and moved targets;

(4) Repeating the steps of (1) to (3), the system realizes the entire measurement of geodetic coordinates of fixed targets and moved targets at a fully mechanized coal mining face;

(5) The system will shut down when the entire measurement of the geodetic coordinates of the fixed targets and moved targets at the fully mechanized coal mining face has been completed.

Advantageous Effects

In the measuring-robot device for a fully mechanized coal mining face according to the present disclosure, each of the measuring robots comprises a suspension cage, a total station, a prism and an industrial computer. The suspension cage with automatic leveling function is fixed on the top beam of the hydraulic support, then the total station and the industrial computer are fixed in the suspension cage, and finally the prism with a plug connector is installed under the base of the total station, forming a measuring-robot device. According to the fluctuations of the fully mechanized coal mining face, several measuring robots will be deployed along the fully mechanized coal mining face, and the adjacent measuring robots are line of sight to each other. Only when the mine laneway has merely one control point visible, the dominant measuring robot requires to be equipped with one gyroscope total station with a gyroscope north seeker, and other measuring robots are all ordinary measuring robots without gyroscope total station. Each of these ordinary measuring robots using an ordinary total station orienting itself b by the backsight of the prism under a measuring robot at coordinates-known point. It then looks forward for a prism under a measuring robot at coordinates-unknown point and measures the angles (i.e. horizontal and vertical) and the slope distance to the prism to obtain the coordinate of the relevant measuring robot. It also may measure the geodetic coordinates of fixed targets and moved targets at the same time.

In other words, when the mine laneway has merely one control point visible, the fully mechanized coal mining face is merely required to be installed with one measuring robot with a gyroscope total station, and the other measuring robots can only equip ordinary total stations. When the mine laneway has at least two control points visible, all measuring robots can use ordinary total stations to realize the entire measurement of the geodetic coordinates of the fixed targets and the moved targets in a fully mechanized coal mining face. The measuring robots using ordinary total stations can complete the measurement of the geodetic coordinates of the fixed targets and the moved targets within several seconds. Such a measuring-robot device does not only save the cost, but also greatly saves the measurement time, which solves problems of using gyroscope total stations, such as time-consuming north seeking, high cost and inapplicability in severe environments.

BRIEF DESCRIPTION OF THE DRAWINGS

By reading the following detailed description of the preferable embodiments, various other advantages and benefits will become clear to a person skilled in the art. The drawings are merely intended to show the preferable embodiments, and are not to be considered as limiting the present disclosure. Furthermore, throughout the drawings, the same reference signs denote the same elements. In the drawings.

DETAILED DESCRIPTION OF THE EMBODIMENTS

Figure 1:
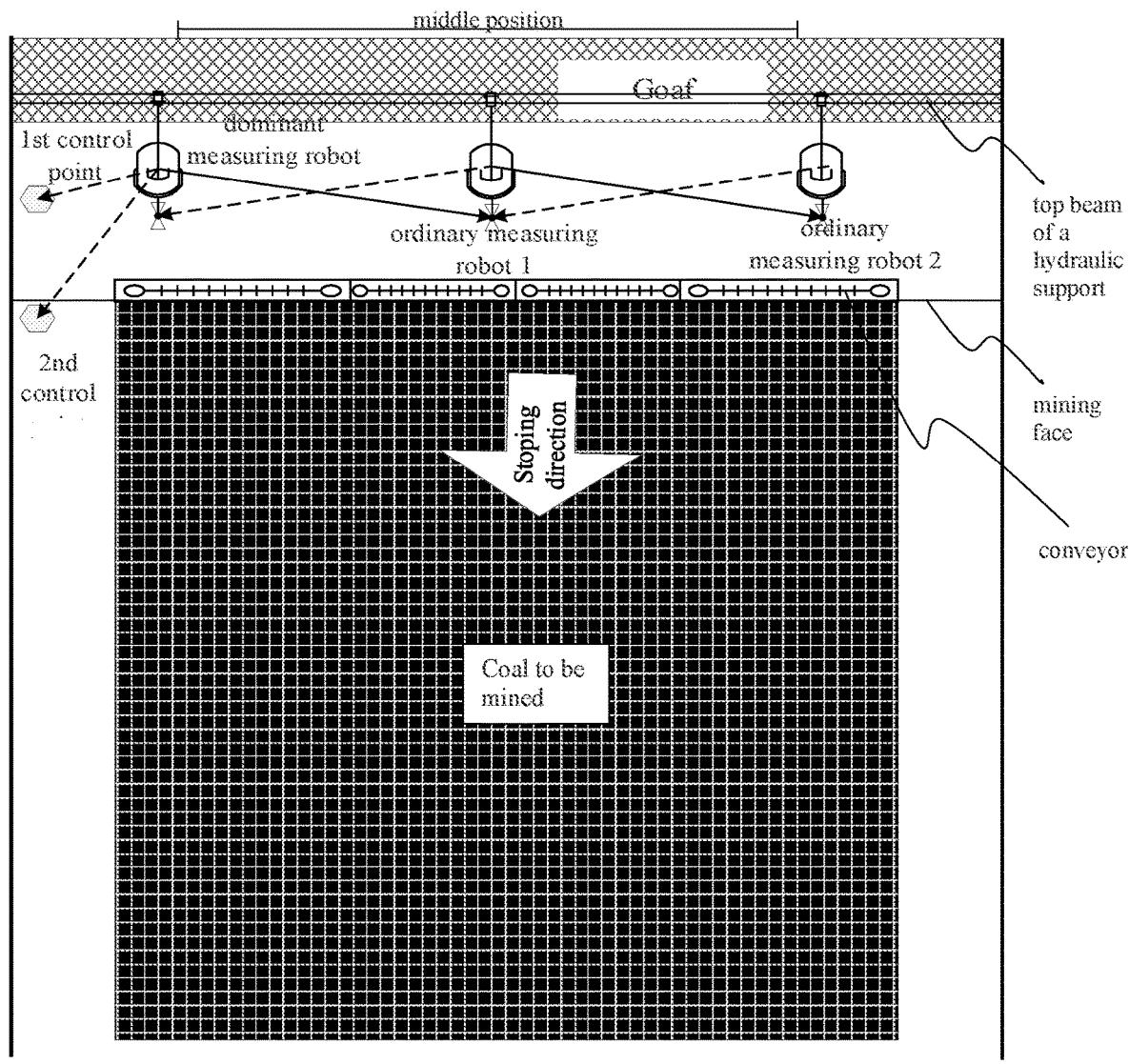
FIG. 1 shows a schematic diagram of the device arrangement of the automatic measuring system for a fully mechanized coal mining face according to the first embodiment of the present disclosure.

The exemplary embodiments of the present disclosure will be described in further detail below with reference to the drawings. Although the drawings illustrate the exemplary embodiments of the present disclosure, it should be understood that the present disclosure may be implemented in various forms, which should not be limited by the embodiments illustrated herein. In contrast, the purpose of providing those embodiments is to more clearly understand the present disclosure, and to completely convey the scope of the present disclosure to a person skilled in the art.

In view of the problems of the prior art, after the fully mechanized coal mining face has been advanced, the north seeking of the gyroscope total station is time-consuming (higher the precision of the north the gyroscope got, more the time consumed), and the gyroscope total station is extremely expensive and can hardly work well in severe environments (e.g. high temperature, high humidity and vibration). The inventor has carefully analyzed the disadvantages of the prior art, with the intention of proposing an improved solution. However, in the process of the improvement, the following two problems exist:

Firstly, the measurement of target points in the fully mechanized coal mining face based on distance intersection can dynamically establish a spatial relation in a unified coordinate system. However, except that the dominant total station at head or tail of the conveyor, the total stations in the middle can't use the distance intersection method because three points (i.e., the station point and the two control points used in the distance resection) approximately lay on the same one line, and the angle with the station point as vertex is approximately zero degree, which can bring a large error to the coordinates and even fail to calculate. However, the environment in downhole operation is complex, and the fully mechanized coal mining face is in process of dynamic advancement. Therefore, how to improve the precision of calculated coordinates is always a difficulty in the field.

Secondly, the north seeking of the gyroscope total station is time-consuming, and the gyroscope total station is extremely expensive and can hardly work well in severe environments. However, in the downhole operation fields, it is very difficult to satisfy the requirement on the precision for safety while reducing the equipment cost.

In view of the above difficulties, after performing many tests, comparing the test results, replacing the test devices and improving the coordinate calculation method, the inventor has finally proposed the following technical concept.

Replacing the gyroscope total stations by prisms and ordinary total stations without gyroscopes, total stations orient themselves by looking for the prism under the measuring robot at station point with known the coordinate at the conveyor rear, determining the true north orientation. After that, total stations look for the prism under the measuring robot at station point with the unknown coordinates, and then measure the angles and the slope distance to obtain the coordinate of the relevant station point.

In the present embodiment, this disclosure proposes a measuring-robot device, which comprises a suspension cage, a total station, a prism and an industrial computer. The suspension cage with automatic leveling function is fixed on the top beam of the hydraulic support, then the total station and the industrial computer are fixed in the suspension cage, and finally the prism with a plug connector is installed under the base of the total station, forming a measuring-robot device. According to the fluctuations of the fully mechanized coal mining face, several measuring robots will be deployed along the fully mechanized coal mining face, and the adjacent measuring robots are line of sight to each other. Only when the mine laneway has merely one control point visible, the dominant measuring robot requires to be equipped with one gyroscope total station with a gyroscope north seeker, and other measuring robots are all ordinary measuring robots without gyroscope total station. Each of these ordinary measuring robots using an ordinary total station orienting itself b by the backsight of the prism under a measuring robot at coordinates-known point. It then looks forward for a prism under a measuring robot at coordinates-unknown point and measures the angles (i.e. horizontal and vertical) and the slope distance to the prism to obtain the coordinate of the relevant measuring robot. It also may measure the geodetic coordinates of fixed targets and moved targets at the same time. In other words, when the mine laneway has merely one control point visible, the fully mechanized coal mining face is merely required to be installed with one measuring robot with a gyroscope total station, and the other measuring robots can only equip ordinary total stations. When the mine laneway has at least two control points visible, all measuring robots can use ordinary total stations to realize the entire measurement of the geodetic coordinates of the fixed targets and the moved targets in a fully mechanized coal mining face. The measuring robots using ordinary total stations can complete the measurement of the geodetic coordinates of the fixed targets and the moved targets within several seconds. However, a gyroscope total station consumes 15 minutes to orient itself once. Such a measuring-robot device does not only save the cost, but also greatly saves the measurement time, which solves problems of using gyroscope total stations, such as time-consuming north seeking, high cost and inapplicability in severe environments.

The First Embodiment

Figure 2:
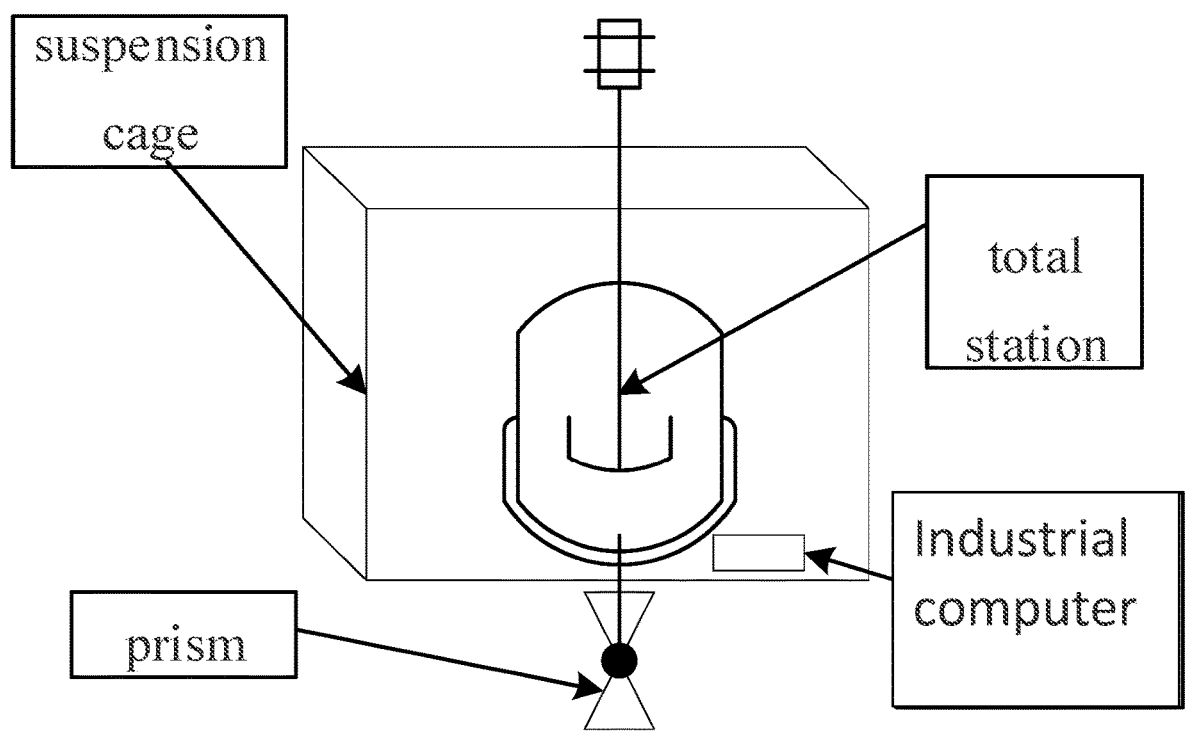
FIG. 2 shows a schematic structural diagram of the measuring-robot device for a fully mechanized coal mining face according to the first embodiment of the present disclosure.

FIG. 2 shows a schematic structural diagram of the measuring robot for a fully mechanized coal mining face according to the present disclosure. As shown in FIG. 2, a measuring-robot device for a fully mechanized coal mining face comprises a suspension cage, a total station, a prism and an industrial computer:

The suspension cage is installed on the top beam of a hydraulic support in the fully mechanized coal mining face, and is for loading the total station, the industrial computer and the prism;

The suspension cage can automatically level, ensuring that the total station inside it maintains horizontal;

The suspension cage is an enclosed space that is waterproof, dust-proof and shock-proof. Because the points are approximately lay on the same line, transparent windows are set at the front and back of the suspension cage for the operation of the total station;

The total station is a measurement platform that integrates automatic target recognition, automatic collimation, automatic angle measurement and distance measurement, automatic target tracking, automatic calculation and automatic storage. The total station is fixed in the center of the cage cavity. The prism is an optical target device measured by the total station. It can be classified into ordinary type and 360-degree type. The prism is installed at the bottom of the suspension cage, whose position is aligned with the total station in the same plumb line. This setting ensures that the horizontal geodetic coordinates of the prism is the same as that of the station point;

The industrial computer is carried inside the suspension cage, installed with a built-in automatic control program of the measuring-robot device. The program controls the measuring-robot device where the industrial computer is located and commands other measuring robots to operate cooperatively;

According to different installation sites and usages, the measuring robots are classified into dominant measuring robot and ordinary measuring robots. The total station of the dominant measuring robot is ordinary or with a gyroscope north seeker, while the total station of the ordinary measuring robots is just ordinary without a gyroscope north seeker;

The ordinary measuring robots using the ordinary total station orients itself by the backsight of the prism under a measuring robot at coordinates-known point. It then looks forward for a prism under a measuring robot at coordinates-unknown point and measures the angles (i.e. horizontal and vertical) and the slope distance to the prism to obtain the coordinate of the relevant measuring robot.

In the embodiment of the present disclosure, each of the measuring robots comprises a suspension cage, a total station, a prism and an industrial computer. The suspension cage with automatic leveling function is fixed on the top beam of the hydraulic support, then the total station and the industrial computer are fixed in the suspension cage, and finally the prism with a plug connector is installed under the base of the total station, forming a measuring-robot device. According to the fluctuations of the fully mechanized coal mining face, several measuring robots will be deployed along the fully mechanized coal mining face, and the adjacent measuring robots are line of sight to each other. Only when the mine laneway has merely one control point visible, the dominant measuring robot requires to be equipped with one gyroscope total station with a gyroscope north seeker, and other measuring robots are all ordinary measuring robots without gyroscope total station. Each of these ordinary measuring robots using an ordinary total station orienting itself by the backsight of the prism under a measuring robot at coordinates-known point. It then looks forward for a prism under a measuring robot at coordinates-unknown point and measures the angles (i.e. horizontal and vertical) and the slope distance to the prism to obtain the coordinate of the relevant measuring robot. It also may measure the geodetic coordinates of fixed targets and moved targets at the same time.

In other words, When the mine laneway has at least two control points visible, all measuring robots can use ordinary total stations to realize the entire measurement of the geodetic coordinates of the fixed targets and the moved targets in a fully mechanized coal mining face. The measuring robots using ordinary total stations can complete the measurement of the geodetic coordinates of the fixed targets and the moved targets within several seconds. However, a gyroscope total station consumes 15 minutes to orient itself once. Such a measuring-robot device does not only save the cost, but also greatly saves the measurement time, which solves problems of using gyroscope total stations, such as time-consuming north seeking, high cost and inapplicability in severe environments.

On the basis of the above-described measuring-robot device for a fully mechanized coal mining face, the present disclosure provides the following embodiments of particular implementations. Without any contradiction, the embodiments can be randomly combined, to form a new measuring-robot device for a fully mechanized coal mining face. It should be understood that all the new measuring-robot devices for a fully mechanized coal mining face formed by any combination of the embodiments should fall within the protection scope of the present disclosure.

In an embodiment of the present disclosure, the dominant measuring robot refers to the one that is fixed on the top beam of a hydraulic support at head or tail of a conveyor in the fully mechanized coal mining face;

The ordinary measuring robots refer to those are fixed on the top beam of a hydraulic support at a middle position of the fully mechanized coal mining face.

The dominant measuring robot is used to control all measuring robots to operate cooperatively. Such a cooperative operation realizes the entire measurement of the geodetic coordinates of the fixed targets and the moved targets on the fully mechanized coal mining face, and solves the problem. This is that the entire spatial relationship has been broken, after the fully mechanized coal mining face is advanced, which cannot meet the demand of real-time positioning of the intelligent fully mechanized coal mining face.

In the embodiment of the present disclosure, the coordinates of the station point of the dominant measuring robot can be determined by using the following two methods:

(1) the dominant measuring robot finds two prisms on control points of the coal wall, and then measures slope distances and angles between the station point of the dominant measuring robot to the two prisms. Finally, calculates the coordinate of the station point of the dominant measuring robot by using the distance resection method. Accordingly, the dominant measuring robot uses a measuring robot without a gyroscope total station. That does not only save the cost, but also greatly saves the measurement time, which solves problems of using gyroscope total stations, such as time-consuming north seeking, high cost and inapplicability in severe environments.

(2) the total station in the dominant measuring robot is a gyroscope total station with north seeking function. The gyroscope total station performs automatic north seeking to determine the orientation from the station point of the dominant measuring robot to a prism on a control point of the coal wall. Then, by measuring the slope distance of angles from the total station to the control point, the coordinate of the station point of the dominant measuring robot can be calculated. The downhole environment is restricted space with harsh conditions. When the mine has merely one control point visible, the coordinates of the station point of the dominant measuring robot cannot be calculated by using the two points distance resection method. Therefore, the total station in the dominant measuring robot should be a gyroscope total station, and the gyroscope total station performs automatic north seeking to determine the orientation from the station point of the dominant measuring robot to the control point, and calculates the coordinates of the station point of the dominant measuring robot by using single point resection method. This configuration solves the problem that, when the mine has merely one control point visible, the coordinates of the station point of the dominant measuring robot cannot be calculated by using the two points distance resection method.

In the embodiment of the present disclosure, the coordinates of the station point of an ordinary measuring robot is calculated by the open traverse surveying method. The open traverse surveying method solves the following problem. The total stations in the middle can't use the distance intersection method because three points (i.e., the station point and the two control points used in the distance resection) approximately lay on the same one line, and the angle with the station point as vertex is approximately zero degree, which can bring a large error to the coordinates and even fail to calculate.

The Second Embodiment

FIG. 1 shows a schematic diagram of the device arrangement of the automatic measuring system for a fully mechanized coal mining face according to the present disclosure. As shown in FIG. 1, an automatic measuring system, which comprises the measuring-robot device according to the first example of this present disclosure. This system is described as follow:

Prisms are set on control points those are on coal walls near the head or tail of the conveyor in a fully mechanized coal mining face. As shown in FIG. 1, the black blocks on the two sides represent the coal wall. The geodetic coordinates of control points of coal walls are measured previously, and these control points serve as basis points for the dominant measuring robot;

The dominant measuring robot is fixed on the top beam of a hydraulic support at head or tail of the conveyor in the fully mechanized coal mining face;

According to the fluctuations of the fully mechanized coal mining face, the ordinary measuring robots are fixed on the top beam of the hydraulic supports in the fully mechanized coal mining face, ensuring that the adjacent measuring robots including the dominant measuring robot are visible to each other. Then the measuring and controlling network can cover the entire coal-mining-face.

In the example of this present disclosure, according to the fluctuations of the fully mechanized coal mining face, several measuring robots will be deployed along the fully mechanized coal mining face, and the adjacent measuring robots are line of sight to each other, forming the automatic measuring system covering the fully mechanized coal mining.

Figure 3:
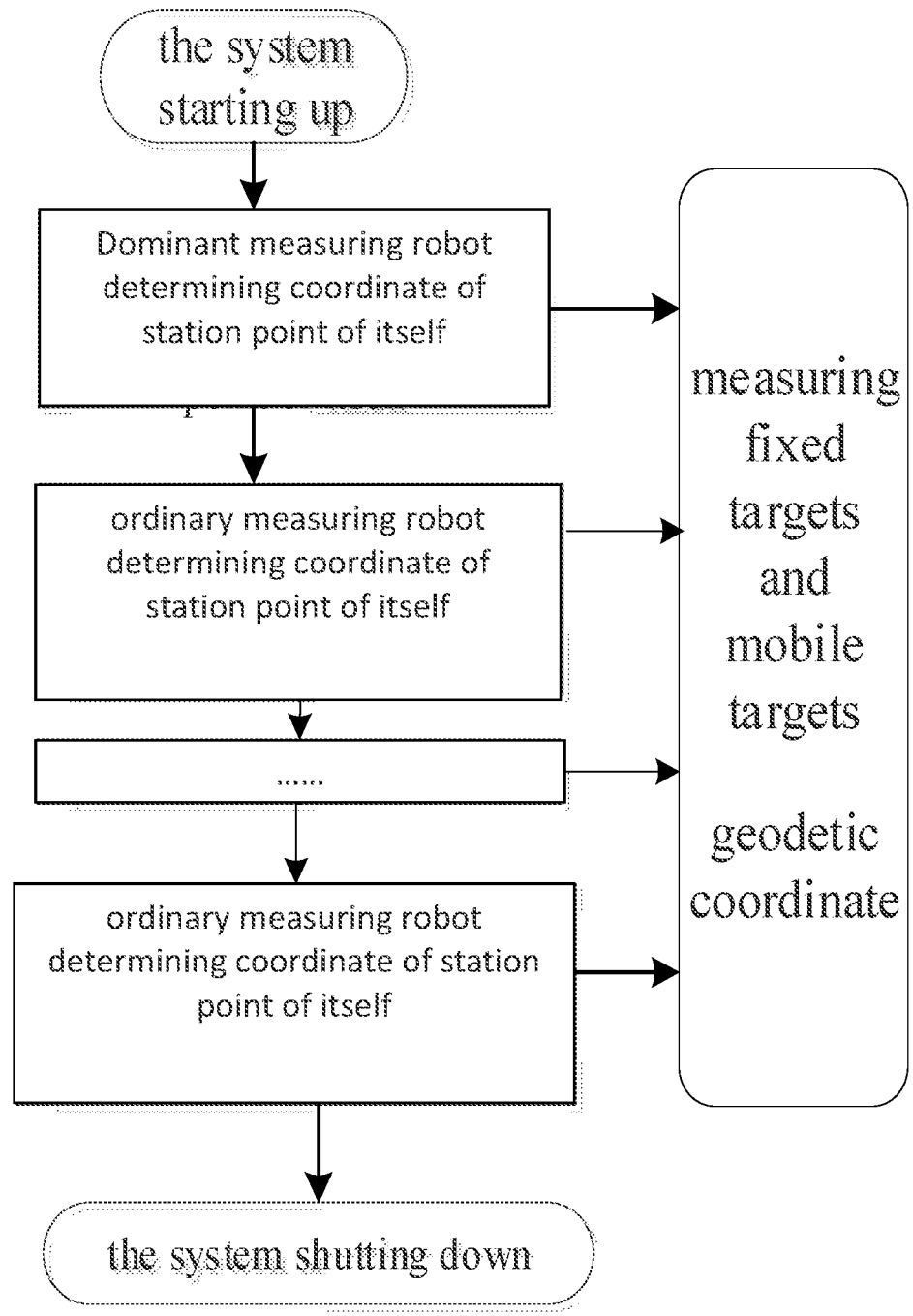
FIG. 3 shows a schematic diagram of the working process of the automatic measuring system for a fully mechanized coal mining face according to the first embodiment of the present disclosure.

In the example of this present disclosure, FIG. 3 shows a schematic diagram of the working process of the automatic measuring system for a fully mechanized coal mining face according to the present disclosure. As shown in FIG. 3, a working process of the automatic measuring system comprises following steps:

(1) The automatic measuring system starts operating;

(2) It obtains the coordinates of the station point of the dominant measuring robot by using the control points of the coal wall. Then the dominant measuring robot looks for the prism under an adjacent measuring robot to obtain the coordinate of its station point. At the same time, the dominant measuring robot can measure geodetic coordinates of fixed targets and moved targets;

(3) Each of the ordinary measuring robots orients itself by looking for the prism under a measuring robot with known station point. Then it obtains the coordinates of the station point of other measuring robots by looking for the prism under the other measuring robot with an unknown station point, measuring the slope distance and angles. At the same time, the ordinary measuring robot can measure geodetic coordinates of fixed targets and moved targets;

(4) As shown in FIG. 3, the ellipsis represents each of the ordinary measuring robots repeating step (3), the system realizes the entire measurement of geodetic coordinates of fixed targets and moved targets at a fully mechanized coal mining face;

(5) The system will shut down when the entire measurement of the geodetic coordinates of the fixed targets and moved targets at the fully mechanized coal mining face has been completed.

It should be understood that, although the description of the present disclosure has described the preferable embodiments of the embodiments of the present disclosure, when a person skilled in the art knows the basic inventive concept, he may make further variations and modifications on those embodiments. Therefore, the appended claims are intended to be interpreted as encompassing the preferable embodiments and all of the variations and modifications that fall within the scope of the embodiments of the present disclosure.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or terminal devices that include a series of elements do not only include those elements, but also include other elements that are not explicitly listed, or include the elements that are inherent to such processes, methods, articles or terminal devices. Unless further limitation is set forth, an element defined by the wording "comprising a . . . " does not exclude additional same element in the process, method, article or terminal device comprising the element.

The measuring-robot device for the fully mechanized coal mining face and the automatic measuring system according to the present disclosure have been described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

The invention claimed is:

1. A measuring-robot device for a fully mechanized coal mining face comprising a suspension cage, a total station, a prism and an industrial control computer, wherein:

the suspension cage is installed on a top beam of a hydraulic support in the fully mechanized coal mining face, and the suspension cage is configured for loading the total station, the industrial control computer and the prism;

the suspension cage is configured for automatically leveling, ensuring that the total station inside the suspension cage maintains horizontal;

the suspension cage is a water-proof, dust-proof and shock-proof enclosed space;

points are approximately laid on a line, transparent windows are set at a front and a back of the suspension cage for an operation of the total station;

the total station is a measurement platform integrating automatic target recognition, automatic collimation, automatic angle measurement and distance measurement, automatic target tracking, automatic calculation and automatic storage, the total station is fixed in a center of a cavity of the suspension cage;

the prism is an optical target device measured by the total station, the prism is installed at a bottom of the suspension cage, a position of the prism is aligned with the total station in a plumb line, ensuring that horizontal geodetic coordinates of the prism is the same as horizontal geodetic coordinates of a station point of the total station;

the industrial control computer is an industrial computer carried inside the suspension cage, the industrial control computer is installed with a built-in automatic control program of the measuring-robot device, the built-in automatic control program controls the measuring-robot device where the industrial control computer is located and commands measuring robots to operate cooperatively;

according to different installation sites and usages, the measuring robots are classified into a dominant measuring robot and ordinary measuring robots, wherein the dominant measuring robot is a measuring robot that determines its own position based on at least one control points of a coal wall, and the ordinary measuring robots are measuring robots that determine their own positions based on positions of other measuring robots;

a total station of the dominant measuring robot has an option to include a gyroscope for measuring and determining north, while a total station of each of the ordinary measuring robots does not include a gyroscope for measuring and determining north;

each of the ordinary measuring robots using an ordinary total station is oriented by a backsight of a first prism under a first measuring robot at coordinates-known station point, each of the ordinary measuring robots using the ordinary total station then looks forward for a second prism under a second measuring robot at coordinates-unknown station point and measures angles and a slope distance to the second prism to obtain a coordinate of the second measuring robot.

2. The measuring-robot device according to claim 1, wherein methods of determining a coordinate of a station point of the dominant measuring robot comprise:

(1) the dominant measuring robot finds two prisms on two control points of the coal wall, and then measures slope distances and angles between the station point of the dominant measuring robot and the two prisms, finally, calculates the coordinate of the station point of the dominant measuring robot by using a distance resection method;

(2) the total station in the dominant measuring robot is a gyroscope total station with a north seeking function, the gyroscope total station performs automatic north seeking to determine an orientation from the station point of the dominant measuring robot to a third prism on one of the control points of the coal wall, then, by measuring a slope distance and angles from the gyroscope total station to the one of the control points of the coal wall, the coordinate of the station point of the dominant measuring robot is calculated.

3. The measuring-robot device according to claim 1, wherein coordinates of a station point of the ordinary measuring robots are calculated by an open traverse surveying method.

4. An automatic measuring system comprising the measuring-robot device according to claim 1, wherein the automatic measuring system comprises a dominant measuring robot, an arrangement of the automatic measuring system comprises:

prisms are set on control points of a coal wall, wherein the control points of the coal wall are on the coal wall near the head or the tail of the conveyor in the fully mechanized coal mining face, geodetic coordinates of the control points of the coal wall are measured previously, and the control points of the coal wall serve as basis points for the dominant measuring robot;

the dominant measuring robot is fixed on the top beam of the hydraulic support at the head or the tail of the conveyor in the fully mechanized coal mining face;

according to fluctuations of the fully mechanized coal mining face, the ordinary measuring robots are fixed on the top beam of the hydraulic support in the fully mechanized coal mining face, ensuring that adjacent measuring robots comprising the dominant measuring robot are visible to each other, then a measuring and controlling network is configured for covering an entire coal-mining-face.

5. The automatic measuring system according to claim 4, wherein a working process of the automatic measuring system comprises:

(1) the automatic measuring system starts operating;

(2) the automatic measuring system obtains a coordinate of a station point of the dominant measuring robot by using the control points of the coal wall, then the dominant measuring robot looks for a fourth prism under an adjacent measuring robot to obtain a coordinate of a station point of the adjacent measuring robot, at the same time, the dominant measuring robot is configured for measuring geodetic coordinates of fixed targets and geodetic coordinates of moved targets;

(3) each of the ordinary measuring robots is oriented by looking for the first prism under the first measuring robot with a known station point; then each of the ordinary measuring robots obtains the coordinate of the station point of the second measuring robot by looking for the second prism under the second measuring robot with an unknown station point, measuring the slope distance and the angles to the second prism, at the same time, each of the ordinary measuring robots is configured for measuring the geodetic coordinates of the fixed targets and the moved targets;

(4) repeating the steps of (1) to (3), the system realizes an entire measurement of the geodetic coordinates of the fixed targets and the moved targets at the fully mechanized coal mining face;

(5) the system shuts down when the entire measurement of the geodetic coordinates of the fixed targets and the moved targets at the fully mechanized coal mining face has been completed.

6. The automatic measuring system according to claim 4, wherein the measuring-robot device, wherein methods of determining a coordinate of a station point of the dominant measuring robot comprise:

(1) the dominant measuring robot finds two prisms on the control points of the coal wall, and then measures slope distances and angles between the station point of the dominant measuring robot and the two prisms, finally, calculates the coordinate of the station point of the dominant measuring robot by using a distance resection method;

(2) the total station in the dominant measuring robot is a gyroscope total station with a north seeking function, the gyroscope total station performs automatic north seeking to determine an orientation from the station point of the dominant measuring robot to a third prism on one of the control points of the coal wall, then, by measuring a slope distance of angles from the gyroscope total station to the one of the control points of the coal wall, the coordinate of the station point of the dominant measuring robot is calculated.

7. The automatic measuring system according to claim 4, wherein the measuring-robot device, wherein coordinates of a station point of the ordinary measuring robots are calculated by an open traverse surveying method.

* * * * *